US010383004B2

(12) United States Patent
Randriamasy et al.

(10) Patent No.: US 10,383,004 B2
(45) Date of Patent: Aug. 13, 2019

(54) TRAFFIC OPTIMIZATION FOR IP CONNECTION OVER AN IP CONNECTIVITY ACCESS NETWORK AND FOR AN APPLICATION ALLOWING A CHOICE OF IP CONNECTION ENDPOINT

(71) Applicant: Alcatel Lucent, Boulogne Billancourt (FR)

(72) Inventors: Sabine Randriamasy, Nozay (FR); Telemaco Melia, Rolle (SZ); Erick Bizouarn, Nozay (FR)

(73) Assignee: ALCATEL LUCENT, Nozay (FR)

( * ) Notice: Subject to any disclaimer, the term of this patent is extended or adjusted under 35 U.S.C. 154(b) by 641 days.

(21) Appl. No.: 14/350,716

(22) PCT Filed: Oct. 11, 2012

(86) PCT No.: PCT/EP2012/070130
§ 371 (c)(1),
(2) Date: Apr. 9, 2014

(87) PCT Pub. No.: WO2013/053803
PCT Pub. Date: Apr. 18, 2013

(65) Prior Publication Data
US 2014/0254382 A1 Sep. 11, 2014

(30) Foreign Application Priority Data
Oct. 13, 2011 (EP) ..................... 11306328

(51) Int. Cl.
*H04W 28/10* (2009.01)
*H04W 40/36* (2009.01)
(Continued)

(52) U.S. Cl.
CPC ......... *H04W 28/10* (2013.01); *H04L 12/5691* (2013.01); *H04L 45/123* (2013.01);
(Continued)

(58) Field of Classification Search
CPC .. H04W 28/10; H04L 12/5691; H04L 45/123; H04L 67/1004
(Continued)

(56) References Cited

U.S. PATENT DOCUMENTS 7,773,536 B2 * 8/2010 Lloyd ................. H04L 12/2602
370/232
8,751,613 B1 * 6/2014 Medved ................. H04L 45/00
370/229
(Continued)

FOREIGN PATENT DOCUMENTS

| CN | 1620039 A | 5/2005 |
|---|---|---|
| WO | 2011/039719 A1 | 4/2011 |
| WO | 2011/054913 A1 | 5/2011 |

OTHER PUBLICATIONS

Interdigital Communications, China Mobile, Panasonic, "Introducing requirements for optimized peer selection," 3GPP TSG SA WG2 Meeting #84, Apr. 11-15, 2011, Bratislava, Slovakia, TD S2-111889 revision of S2-111754, Document for: Approval, Agenda Item: 7.6.3, Work Item / Release: FS_IMS_P2P_CDS, 3 pages.
(Continued)

*Primary Examiner* — Edan Orgad
*Assistant Examiner* — Nourali Mansoury
(74) *Attorney, Agent, or Firm* — Fay Sharpe LLP

(57) ABSTRACT

In an embodiment, there is provided a method for optimization of IP traffic between a User Equipment having access to an IP network via an IP Connectivity Access Network, and an IP connection endpoint in said IP network, for an application allowing a choice in said IP connection endpoint, said method comprising at least one step based on a selection of an IP connection endpoint according to end-to-end IP traffic optimization criteria.

16 Claims, 3 Drawing Sheets

(51) Int. Cl.
*H04L 12/721* (2013.01)
*H04W 8/08* (2009.01)
*H04L 12/54* (2013.01)
*H04L 29/08* (2006.01)
*H04W 28/08* (2009.01)

(52) U.S. Cl.
CPC ........ *H04L 67/1004* (2013.01); *H04L 67/104* (2013.01); *H04W 8/082* (2013.01); *H04W 28/08* (2013.01); *H04W 40/36* (2013.01)

(58) Field of Classification Search
USPC .......................................................... 370/235
See application file for complete search history.

(56) References Cited

U.S. PATENT DOCUMENTS

| | | | |
|---|---|---|---|
| 2007/0072605 | A1 | 3/2007 | Poczo et al. |
| 2010/0110937 | A1* | 5/2010 | Vennelakanti ........ H04L 12/189 370/256 |
| 2011/0216743 | A1* | 9/2011 | Bachmann ............ H04L 63/164 370/331 |
| 2011/0222523 | A1* | 9/2011 | Fu ......................... H04W 36/22 370/338 |
| 2011/0317571 | A1* | 12/2011 | Kokkinen ............. H04W 24/00 370/252 |
| 2011/0320580 | A1* | 12/2011 | Zhou ....................... H04L 12/14 709/223 |
| 2012/0082073 | A1* | 4/2012 | Andreasen .......... H04L 12/4633 370/310 |
| 2012/0173661 | A1* | 7/2012 | Mahaffey ................ H04L 67/14 709/217 |
| 2012/0281621 | A1* | 11/2012 | Lotfallah .............. H04L 12/145 370/328 |
| 2013/0044682 | A1* | 2/2013 | Qiang ................... H04W 8/085 370/328 |

OTHER PUBLICATIONS

Interdigital Communications, "ALTO server in IMS P2P CDS," $3^{rd}$ Generation Partnership Project (3GPP), SA WG2 Meeting #86, S2-113325, pp. 1-4, XP050548608, Naantali, Finland, Jul. 11-15, 2011.

3GPP, "$3^{rd}$ Generation Partnership Project Technical Specification Group Services and System Aspects; Feasibility Study on IMS Based Peer-to-Peer Content Distribution Services; Stage 2 (Release 11)," 3GPP TR 23.844 V0.3.1, pp. 1-30, XP050548195, Aug. 2011.

Interdigital Communications, "P2P CDS procedures incorporating ALTO," $3^{rd}$ Generation Partnership Project (3GPP), SA WG2 Meeting #87, S2-114299, pp. 1-4, XP050549477, Jeju Island, South Korea, Oct. 10-14, 2011.

Chung-Ming Huang et al., "Network-aware P2P file sharing over the wireless mobile networks," IEEE Journal on Selected Areas in Communications, vol. 25, No. 1, pp. 1-55 XP011155859, Jan. 2007.

Alimi R. et al., "ALTO Protocol; draft-ietf-alto-protocol-08.txt," No. 8, pp. 1-75, XP015076017, May 20, 2011.

International Search Report for PCT/EP2012/070130 dated Nov. 30, 2012.

Chung-Ming Huang et al., "Network-Aware P2P File Sharing over the Wireless Mobile Networks", IEEE Journal on Selected Areas in Communications, vol. 25, No. 1, Jan. 2007, 7 pages.

"3rd Generation Partnership Project; Technical Specification Group Services and System Aspects; IP Multimedia Subsystem (IMS); Stage 2 (Release 9)", 3GPP Standard; Technical Specification; 3GPP TS 23.228, 3rd Generation Partnership Project (3GPP), Mobile Competence Centre; 650, Route Des Lucioles ; F-06921 Sophia-Antipolis Cedex ; France, vol. SA WG2, No. V9.4.0, Sep. 29, 2010 (Sep. 29, 2010), pp. 1-253, XP051296935, [retrieved on Sep. 29, 2010].

Anonymous: "The Evolved Packet Core", www.3gpp.org, Aug. 14, 2018 (Aug. 14, 2018), XP055499471, Retrieved from the Internet: URL:http://www.3gpp.org/technologies/keywords-acronyms/100-theevolved-packet -core [retrieved on Aug. 14, 2018].

* cited by examiner

TRAFFIC OPTIMIZATION FOR IP CONNECTION OVER AN IP CONNECTIVITY ACCESS NETWORK AND FOR AN APPLICATION ALLOWING A CHOICE OF IP CONNECTION ENDPOINT

The present invention generally relates to communications in general, and more particularly communications over mobile networks.

Detailed descriptions of mobile networks and systems can be found in the litterature, such as in particular in Technical Specifications published by standardisation bodies such as for example 3GPP (3$^{rd}$ Generation Partnership Project).

An example of mobile communication system is Evolved Packet System EPS, specified in particular in 3GPP TS 23.401 and 3GPP TS 23.402. IN a system such as for example EPS, a mobile terminal also called User Equipment (UE) has access to an IP network (also called Packet Data Network PDN) via an IP-Connectivity Access Network IP-CAN. In a system such as for example EPS, the IP-CAN includes Evolved Packet Core EPC that can be accessed by multiple accesses including 3GPP accesses (such as E-UTRAN or GERAN/UTRAN) and non-3GPP accesses (such as trusted WiFi or non-trusted WiFi). Systems such as for example EPS also enable access to multiple PDNs identified by respective Access Point Names APNs. Functionalities enabling to control the routing of IP traffic over IP-CANs such as for example EPS network (in particular taking into account operator's policies or preferences for such routing) have been introduced. Examples of such functionalities include IP Flow Mobility (IFOM), Multi-Access PDN Connectivity (MAPCON), and Access Network Discovery and Selection Function (ANDSF), specified in particular in 3GPP TS 23.261 and 3GPP TS 23.402 for EPS, and Media Independent Handover (MIH) specified by standard IEEE 802.21, see http://www.ieee802.org/21/. Functionalities required for enabling such routing of IP traffic in a mobile terminal (such as User Equipment) may be implemented by a Connection Manager(CM). More detail on such Connection Manager functionalities can be found for example in http://tools.ietf.org/id/draft-seite-mif-connection-manager-02.txt.

An PDN connection, such as in particular IP connection, may be established between a User Equipment having access to an IP network (such as for example the Internet) via an IP Connectivity Access Network (such as for example EPS), and an IP connection endpoint in said IP network, Traffic related to various applications may be carried by such IP connection. Some applications, such as for example peer-to-peer (P2P) and content delivery, allow a choice in connection endpoints. Services such as for example the Application Layer Traffic Optimization (ALTO) service can then be used for connection endpoint selection, in order to increase locality of traffic, improve user-experience, amongst others. More detail on ALTO service and protocol can be found for example in ALTO protocol, draft-ietf-alto-protocol-08.txt, May 2011.

As will be explained with more detail later, there is a need to improve optimization of IP traffic between a User Equipment having access to an IP network via an IP Connectivity Access Network, and an IP connection endpoint in said IP network, for an application allowing a choice in said IP connection endpoint.

Embodiments of the present invention in particular address such needs.

These and other objects are achieved, in one aspect, by a method for optimization of IP traffic between a User Equipment having access to an IP network via an IP Connectivity Access Network, and an IP connection endpoint in said IP network, for an application allowing a choice in said IP connection endpoint, said method comprising at least one step based on a selection of an IP connection endpoint according to end-to-end IP traffic optimization criteria.

These and other objects are achieved, in other aspects, by different entities for performing such method. Such entities may include, in particular, mobile terminal (such as in particular User Equipment), network Topology Aware Information Server TAIS (such as in particular ALTO server). A mobile terminal (such as in particular User Equipment UE) may in turn include various entities, such as in particular Connection Manager, and TAIS or ALTO client.

Some embodiments of apparatus and/or methods in accordance with embodiments of the present invention are now described, by way of example only, and with reference to the accompanying drawings, in which:

FIG. 1 illustrates a first example of use of embodiments of the present invention, FIG. 2 illustrates illustrates a second example of use of embodiments of the present invention, FIG. 3 illustrates an example of functions performed in an User Equipment, according to embodiments of the present invention, in the example illustrated in FIG. 1, FIG. 4 illustrates an example of functions performed in an User Equipment, acccording to embodiments of the present invention, in the example illustrated in FIG. 2.

Market reports and advertisements for terminals reflect the gear towards massive downloads seamlessly coupled with mobility wherever one is located. At the same time network operators want to offer easy access to popular content, as they progressively get to operate themselves the delivery and management of content. These applications are highly demanding on Quality of Experience (QoE) which is how the user perceived the quality of application session in terms of e.g. latency, throughput, packet loss. The challenge now for the mobile network operators is to provide QoE to their customers while minimizing the costs induced in their network operation.

As broadband greedy and highly bursty sessions can be initiated arbitrarily, they need to be well prepared and maintained. Evolved Packet Systems (EPS) also referred to as LTE networks support connections to the Internet via several access technologies among which flows can be distributed.

3GPP has specified the Evolved Packet Core (EPC), which is the next generation core network for cellular networks. The EPC defines the following key functions: the Serving Gateway (S-GW), the PDN Gateway (P-GW) and the Mobility Management Entity (MME). These three functions cooperate with the security Home Subscriber Server (HSS) and Policy and Charging Control (PCC) infrastructure, in order to rule the traffic forwarding capabilities of the core and access network.

In particular, the EPC allows the use of simultaneous PDN connections. That is, a mobile device can configure multiple Access Point Names (APN) and receive multiple IP addresses on the single 3GPP wireless interface. In addition the EPC also provides wireless access to non 3GPP networks such as WIFI. 3GPP already specified the non 3GPP non trusted WLAN access by means of the evolved Packet Data Gateway (ePDG), a VPN concentrator where each UE has to connect via a secured connection. Currently similar work has started to define WIFI access also for non 3GPP trusted networks (also referred as trusted WIFI access).

The support for heterogeneous wireless access combined with the availability of multi-mode mobile devices opens opportunities for new usage. Functions IP Flow Mobility (IFOM) and Multi-Access PDN CONnectivity (MAPCON) are two of the future usages envisioned by 3GPP. MAPCON refers to the capability of simultaneously using two or more APNs. IFOM refers to the capability of using the same APN across two wireless access networks (e.g. LTE and WIFI). MAPCON enables use cases such as using LTE for QoS demanding applications and WIFI for best effort traffic. IFOM enables seamless roaming of applications across LTE and WIFI technologies.

Currently a key tool to strive IP traffic over a non-3GPP technology is the Access Network Discovery and Selection Function (ANDSF). The ANDSF transfers to the UE the mobile operator policy to connect through non 3GPP access technologies such as WiFi and WiMAX and enables thus a traffic steering that adapts to the QoS and traffic of the controlled LTE network.

Another tool is the Media Independent Handover (MIH) Client-Server protocol, that provides information and Handover assistance services to 3GPP access technologies such as WiFi and WiMAX.

While the ANDSF and MIH enable traffic offload and optimization of the network resources, its visibility and decision scope however is limited to the LTE network: it cannot see the end to end path and thus take into account the QoE perceived at the UE, which is more and more challenged by massive use of resources and performances greedy applications.

To improve its QoE and address application needs (e.g. video download), the UE may use the IETF ALTO protocol, whose design goal is to optimize both the user Quality of Experience (QoE) and the usage of network resources by providing to the UE information helping it to choose the best possible location from which to download the whole or piece of video.

It is not the responsibility of the ALTO protocol to care about the UE mobility. However, the mobility of a UE can impact its path to the PDN and thus the path to the content and thus the related QoE. Therefore, it is necessary to inform the UE, which could take the appropriate decisions, concerning the changes occurred in its path,. Currently, during mobility there is no association between network level information and application level information when a handover occurs.

As for ALTO: the IETF ALTO working group provides guidance to content delivery applications in networks such as P2P or Content Delivery Networks (CDN), which have to select one or several hosts or endpoints from a set of candidates that are able to provide a desired data resource. This guidance shall be based on parameters that affect performance and efficiency of the data transmission between the hosts, e.g., the topological distance. The ultimate goal is to improve QoE of the application while reducing resource consumption in the underlying network infrastructure. To this end, ALTO Servers deployed by Network Operators (NO), provide requesting ALTO Clients with information, currently such as the NO-centric view on the network topology, the routing costs among applicable pairs of endpoint groups (called "PID") of this topology, and information on the individual endpoints such as their routing cost or connectivity type or the routing cost to their associated endpoint group.

In the following, embodiments of the present invention using an ALTO server will more particularly be considered by way of example. However, embodiments of the present invention are not limited to such example, and more generally any network Topology Aware Information Server (TAIS) could be used.

Embodiments of the present invention enable to ensure QoE continuity by associating application awareness to both the preparation of a connection to a correspondent node (CN) and its possible handover, without creating decision conflicts with network-level policy functions such as ANDSF.

Embodiments of the present invention provide a cross layer cooperative solution to manage the connections of a mobile User Equipment (UE) performing QoE demanding sessions and having the choice among multiple candidate CNs, such as content downloading or distributed applications. It provides information on the cost associated to the choice of a given Correspondent Node (CN) and shares it with the Connection Manager (CM), which a functionality implemented in the mobile device or user equipment.

This implies the involvement of protocols such as the IETF Application layer Traffic Optimization (ALTO). Such solution would also benefit from extensions of the ALTO features to mobile core networks.

Embodiments of the present invention enable to improve the broadband service continuity by guarantying the service quality by connecting an ALTO Client to the Connection Manager (CM) and using the ALTO protocol in different possible ways, including in particular:

In a proactive way: when the UE is MAPCON capable and has the possibility to distribute its flows among several P-GWs via their associated interfaces on the UE. In that case, the CM hands the set of candidate CNs to the ALTO Client that requests information from the ALTO server in order to rank them w.r.t. their path cost to the UE. The UE is then appropriately connected to the selected CNs.

In an adaptive way: when IP Flow Mobility (IFOM) performed on a flow leads to a change of Serving Gateway (SGW). The IFOM has been driven by the ANDSF or by the MIH service(s), that considers the conditions of the network at the EPS scope and is completely agnostic to the QoE needs of the application sessions running on the UE. After the IFOM, the path between the UE and the PGW may have changed and therefore its costs. This change may affect the overall cost between the UE and the CN and therefore the CM notifies to its co-located ALTO Client that it must update its cost values to the candidate CNs, provided this CN has been previously selected with the help of the ALTO protocol.

FIGS. 1 and 2 illustrate resp. the adaptive and proactive usage of ALTO-COMEPS for the distribution of flows.

Embodiments of the present invention described hereinafter correspond more particularly, by way of example, to LTE context where the application is video downloading from a storage location in the Internet Suppose that the user equipment (UE) receives content from a CN which is a source content location called here an Endpoint (EP). This Source EP (SEP) has been previously selected among a set of candidate EPs from which the desired content is available, by optimizing the cost of downloading and routing to the UE. The IP path between the SEP and the UE is noted P(SEP, UE) and is a concatenation of the path between the UE and the PDN Gateway (PGW) in the EPC and the path between the PGW and SEP. These 2 paths are respectively noted P(PGW, UE) and P(SEP, PGW).

It is assumed here that the UE has an ALTO Client or is connected to an ALTO client that gets from an ALTO Server the path cost to an EP. Note that any other means used to evaluate the path cost to application CNs is applicable.

1) A first embodiment, corresponding to Adaptive ALTO-COMEPS, is first described in connection with FIGS. 1 and 3.

On the IP route between UE and PGW lies the Serving Gateway (SGW) to which the UE is attached. Suppose that an IFOM causes a change of SGW: the path between the SEP and the UE is thus changed, in its last hop, that is between the PGW and the SGW. This is illustrated in FIG. 1.

Although, after a IFOM, the list of candidate EPs remains the same, the associated downloading and routing cost may have changed and needs to be updated. A possible consequence is that the currently used EP to download from is no more optimal and needs to be changed.

The UE is notified by the CM of the change in the EPC path in order to re-evaluate the cost of relevant EPs.

Figure 1:
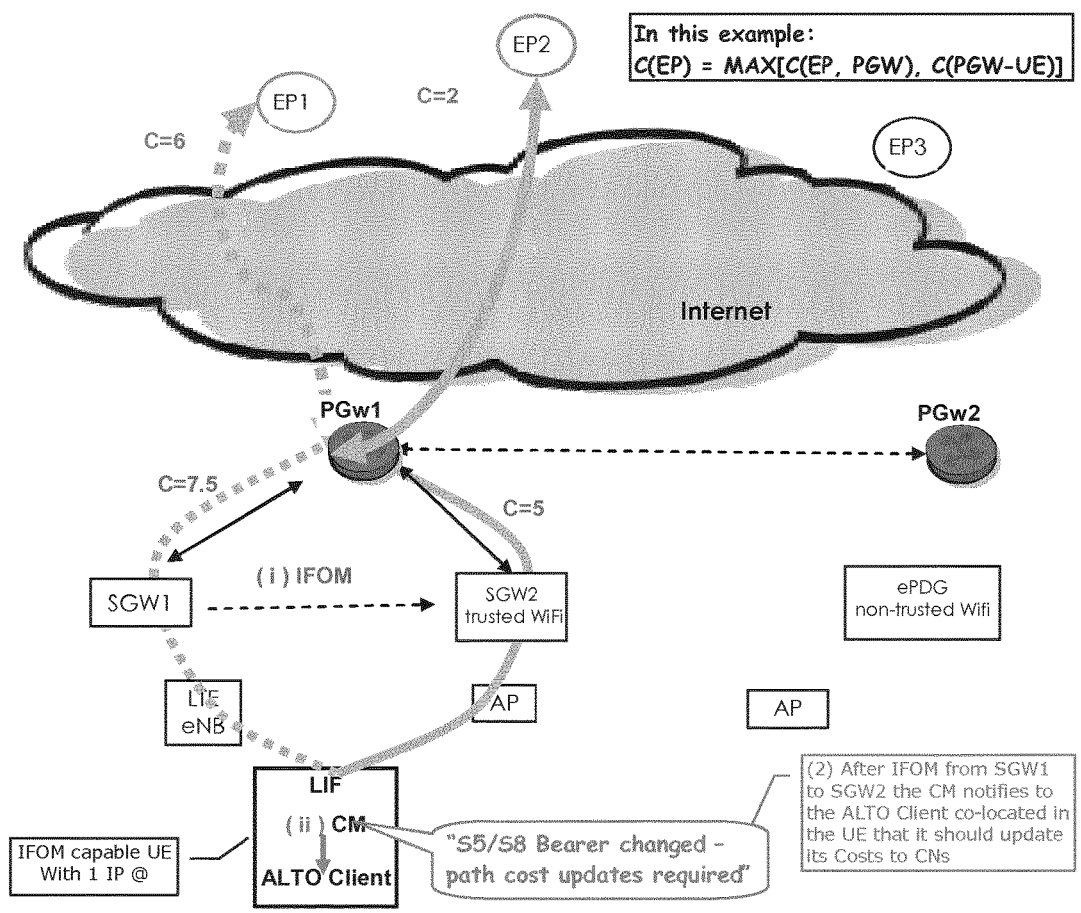
FIGS. 1 and 2 illustrate resp. the adaptive and proactive usage of ALTO-COM EPS for the distribution of flows.

FIG. 1 Illustrates adaptive ALTO-COMEPS in the EPS context, on an example with an IFOM-capable UE with one IP address.

Following steps are illustrated in FIG. 1:

(i) IFOM causes a change from SGW2 to SGW2 and subsequently a change of the associated path cost from the user equipment (UE) to endpoints (EPs) in the packet data network.

(ii) once the HO is performed, the CM requests the ALTO Client to update its path costs to the current CNs, say the EPs. Suppose that the cost of the end to end path (from UE to EP) is calculated as MAX[P(EP, PGW), P(PGW, UE)], and is to be minimized. In this example, the path cost from UE to PGW evolves from 7.5 to 5. With SGW2, the least cost EP becomes EP2 with C=5, where as the cost with EP1 equals 7.5, so EP2 is preferable.

Note that cost of type C= MAX_i(Ci) are frequent when the worst value must be taken over the Ci, for instance to evaluate the cost in terms of bandwidth availability.

Figure 3:
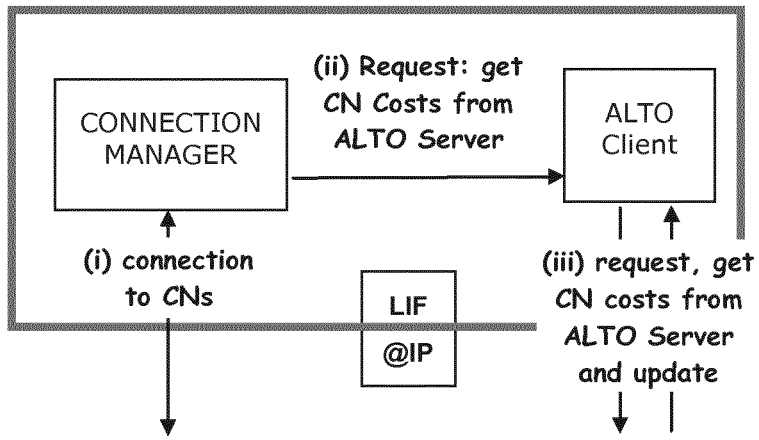
FIGS. 3 and 4 illustrate resp. the ALTO-COMEPS message exchange and operation sequencing within a UE, resp. in the adaptive/IFOM context and in the proactive/MAPCON context.

FIG. 3 depicts an example of functional blocks required in the UE to get this solution operational. The Connection Manager exchanges messages with the ANDSF client installed in the UE. The CM is also aware of the IP flows sent or received by the UE. When a change in the IP flow routing in the EPS is detected, the CM triggers the ALTO client who can subsequently request an update of the costs to the eligible SEPs. Upon reception of the new cost values, the ALTO client could decide to change its corresponding SEP. Instead of an ANDSF Client, an MIH Client can be used.

Figure 4:
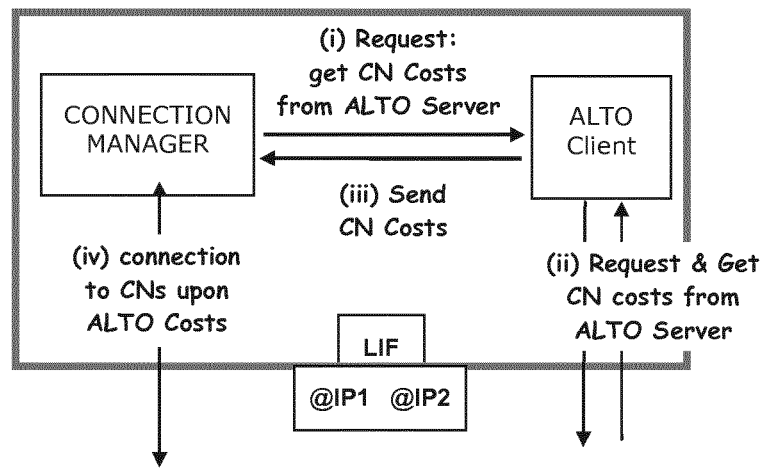

2) A second embodiment, corresponding to Proactive ALTO-COMEPS, is now described in connection with FIGS. 2 and 4.

For the proactive case the UE is enabled with MAPCON capabilities and has configured multiple IP addresses. As for the adaptive use-case, the UE implements the CM and the ANDSF client as well as an ALTO client. Note that instead of an ANDSF Client, an MIH Client can be used.

Figure 2:
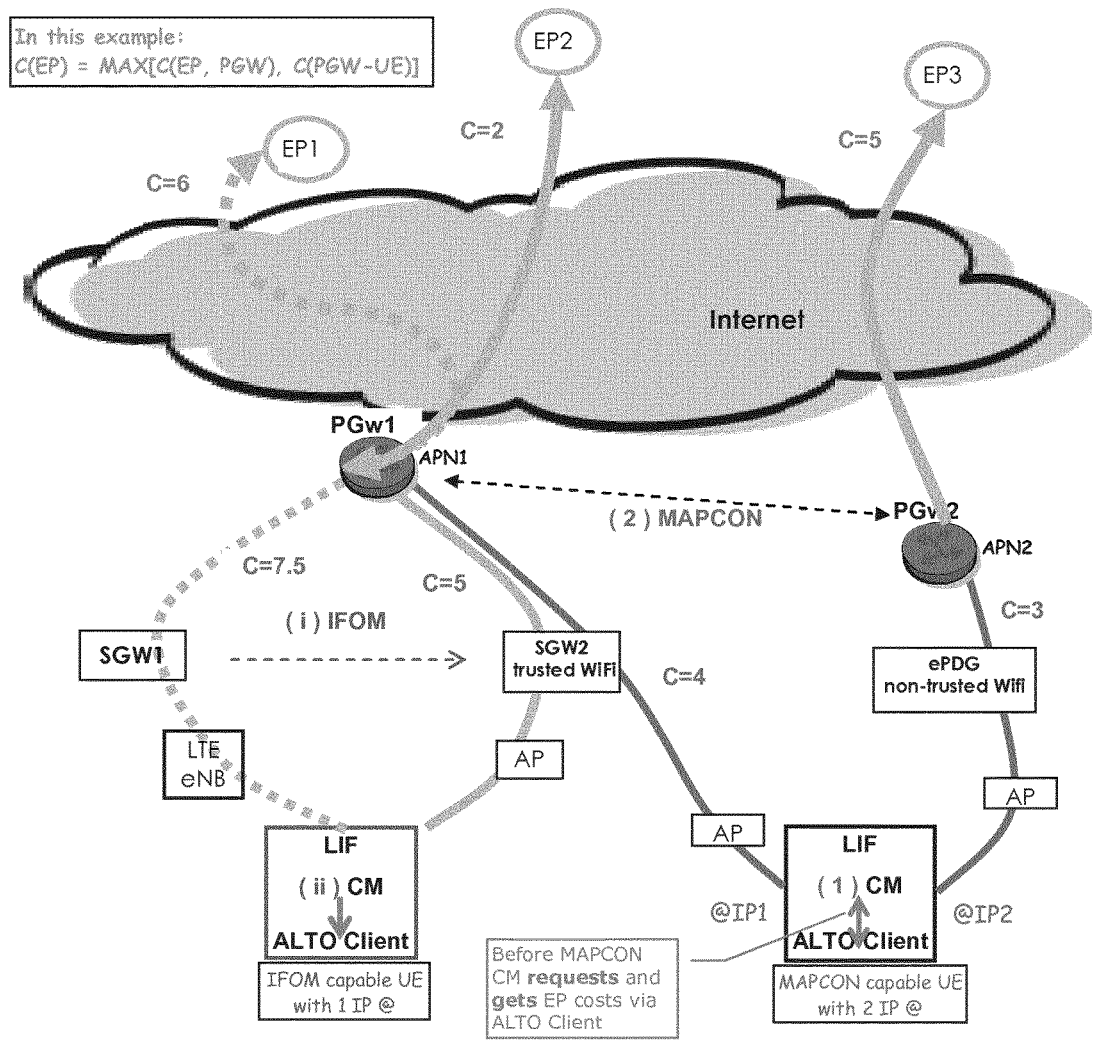

FIG. 2 illustrates Proactive ALTO-COMEPS on an example with a MAPCON-capable UE with 2 IP addresses. The UE can be connected to both APN1 and APN2. The CM in the UE holds a set of eligible CNs accessible via APN1 (PGW1) and APN2(PGW2). The distribution among both APNs is based on ANDSF instructions or information received from an MIH Server. Before selecting a CN, the CM requests the ALTO Client to get the path Costs to the eligible CNs, say the EPs, from the ALTO server. The CM selects the CNs upon the information provided by the ALTO Client and sets the appropriate connections.

When a new application is started in the UE, an IP address and an interface need to be selected to send and receive data. Such selection process currently follows procedures such as for example standard RFC 3484 procedures. In an embodiment of the present invention, such selection process is enhanced with the costs metrics provided via the ALTO client. FIG. 4 describes the procedures necessary to perform the selection process. First, the CM triggers the ALTO client. Upon reception of the costs to the eligible SEPs from the ALTO client, the CM can select the corresponding SEP across the APNs. It then informs the application of the IP address to be used to connect to the selected corresponding SEP. In this sense, the IP address selection procedure becomes both network-aware thanks to the ANDSF or MIH guidance and QoE-aware thanks to the ALTO guidance that provides optimal SEP selection w.r.t. the end to end path costs.

QoE sensitive and bandwidth demanding applications on mobiles are exploding. LTE networks allow distributing the flows of a connection among several access technologies through decision features such as the ANDSF and MIH that provide guidance to inter-RAT flow mobility functions such as IFOM or MAPCON. The ALTO protocol completes these features by providing guidance to choose the correspondent nodes of a UE, based on a topology-aware end to end knowledge of the connection path.

Embodiments of the present invention allow a UE to improve its application QoE in a network-aware manner by associating the ALTO protocol with ANDSF functions in a Connection Manager in a completely complementary way.

On one hand, there is currently no standard way for the network layer to cooperate with the application layer. On the other hand, the decision scope of ANDSF is currently limited to the path from the UE to the PDN. The ALTO protocol provides network-based guidance to the selection of application endpoints with a visibility of the end to end path, where as the ANDSF and MIH scope generally represent the last hop. Embodiments of the present invention overcome these two limitations by integrating an ALTO Client with a Connection Manager and thus allows associating the network-based and application based decisions, without creating conflicts or incoherencies.

In one aspect, there is provided a method for optimization of IP traffic between a User Equipment having access to an IP network via an IP Connectivity Access Network, and an IP connection endpoint in said IP network, for an application allowing a choice in said IP connection endpoint.

Various embodiments may be provided, including following embodiments which may be taken alone or in combination, according to various combinations.

In an embodiment, said method comprises at least one step based on a selection of an IP connection endpoint according to end-to-end IP traffic optimization criteria.

In an embodiment, said method comprises a step of:
  a network topology aware information server TAIS, such as ALTO server, providing information enabling said User Equipment to select one or several IP connection endpoints according to said end-to-end IP traffic optimization criteria.

In an embodiment, said method comprises a step of:
upon selection of a new IP-CAN traffic path for an already started application, said User Equipment selecting an IP connection endpoint according to said end-to-end IP traffic optimization criteria, based on information received from an a network topology aware information server TAIS, such as ALTO server.

In an embodiment, said method comprises a step of:
upon selection of a new IP-CAN traffic path for an already started application, said User Equipment requesting to a network topology aware information server TAIS, such as ALTO server, information enabling selection of an IP connection endpoint according to said end-to-end IP traffic optimization criteria.

In an embodiment, said method comprises a step of:
upon starting an application, said User Equipment selecting an IP connection endpoint according to end-to-end IP traffic optimization criteria, based on information provided by a network topology aware information server TAIS, such as ALTO server.

In an embodiment, said method comprises a step of:
upon starting an application, said User Equipment configuring itself for a traffic path associated with an IP connection endpoint selected according to said end-to-end IP traffic optimization criteria.

In an embodiment, said method comprises a step of:
upon starting an application, said User Equipment requesting to a network topology aware information server TAIS, such as ALTO server, information enabling selection of an IP connection endpoint according to said end-to-end IP traffic optimization criteria.

In an embodiment, IP-CAN corresponds to 3GPP EPS, and selection of an IP-CAN traffic path corresponds to selection of a 3GPP or non-3GPP access and/or selection of an Access Point Name for an IP connection or an IP flow belonging to an IP connection.

In an embodiment, IP-CAN corresponds to 3GPP EPS, and selection of an IP-CAN traffic path corresponds to selection of a 3GPP or non-3GPP access and/or selection of an Access Point Name for an IP connection or an IP flow belonging to an
IP connection, according to operator's policies provided by a policy server such as ANDSF server.

Other aspects relate to different entities configured to perform such method. Such entities may include, in particular, mobile terminal (such as in particular User Equipment), network Topology Aware Information Server TAIS (such as in particular ALTO server). A mobile terminal (such as in particular User Equipment UE) may in turn include various entities, such as in particular Connection Manager, and TAIS or ALTO client.

The detailed implementation of such entities does not raise any special problem for a person skilled in the art, and therefore does not need to be more fully disclosed than has been made above, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for optimization of internet protocol traffic between a user equipment having access to an internet protocol network via an internet protocol connectivity access network, and an internet protocol connection endpoint in said internet protocol network, for an application allowing a choice in said internet protocol connection endpoint, said method comprising at least one step based on a selection of an internet protocol connection endpoint according to end-to-end internet protocol traffic optimization criteria, and further comprising:
upon selection of a new internet protocol connectivity access network traffic path for an already started application, said user equipment requesting from a network topology aware information server information enabling selection of the internet protocol connection endpoint according to said end-to-end internet protocol traffic optimization criteria;
wherein internet protocol connectivity access network corresponds to third generation partnership project evolved packet system, and selection of an internet protocol connectivity access network traffic path corresponds to selection of a third generation partnership project or non-third generation partnership project access for an internet protocol flow belonging to an internet protocol connection.

2. The method according to claim 1, comprising:
the network topology aware information server providing information enabling said user equipment to select one or several internet protocol connection endpoints according to said end-to-end internet protocol traffic optimization criteria.

3. The method according to claim 1, comprising:
upon the selection of the new internet protocol connectivity access network traffic path for the already started application, said user equipment selecting the internet protocol connection endpoint according to said end-to-end internet protocol traffic optimization criteria, based on information received from the network topology aware information server.

4. The method according to claim 1, comprising:
upon starting the application, said user equipment selecting the internet protocol connection endpoint according to the end-to-end internet protocol traffic optimization criteria, based on information provided by the network topology aware information server.

5. The method according to claim 1, comprising:
upon starting the application, said user equipment configuring itself for a traffic path associated with the internet protocol connection endpoint selected according to said end-to-end internet protocol traffic optimization criteria.

6. The method according to claim 1, comprising:
upon starting the application, said user equipment requesting to the network topology aware information server information enabling selection of the internet protocol connection endpoint according to said end-to-end internet protocol traffic optimization criteria.

7. The method according to claim 1, wherein the internet protocol connectivity access network corresponds to the third generation partnership project evolved packet system, and selection of the internet protocol connectivity access network traffic path corresponds to at least one of selection of the third generation partnership project or non-third generation partnership project access and selection of an access point name for the internet protocol connection or the internet protocol flow belonging to the internet protocol connection, according to operator's policies provided by a policy server.

8. The method according to claim 7, wherein the policy server is an access network discovery and selection function server.

9. The method according to claim 1, wherein the network topology aware information server is an application layer traffic optimization server.

10. A user equipment for optimization of internet protocol traffic between a user equipment having access to an internet protocol network via an internet protocol connectivity access network, and an internet protocol connection endpoint in said internet protocol network, for an application allowing a choice in said internet protocol connection endpoint, said method comprising at least one step based on a selection of an internet protocol connection endpoint according to end-to-end internet protocol traffic optimization criteria, the user equipment being configured to:
   upon selection of the new internet protocol connectivity access network traffic path for an already started application, said user equipment requesting to a network topology aware information server information enabling selection of the internet protocol connection endpoint according to said end-to-end internet protocol traffic optimization criteria;
   wherein internet protocol connectivity access network corresponds to 3GPP evolved packet system, and selection of an internet protocol connectivity access network traffic path corresponds to selection of a third generation partnership project or non-third generation partnership project access for an internet protocol flow belonging to an internet protocol connection.

11. The user equipment according to claim 10, further configured to, upon selection of the new internet protocol connectivity access network traffic path for the already started application, selecting the internet protocol connection endpoint according to said end-to-end internet protocol traffic optimization criteria based on information received from the network topology aware information server.

12. The method according to claim 10, wherein the internet protocol connectivity access network corresponds to the third generation partnership project evolved packet system, and at least of selection of the internet protocol connectivity access network traffic path corresponds to selection of the third generation partnership project or non-third generation partnership project access and selection of an access point name for the internet protocol connection or the internet protocol flow belonging to the internet protocol connection, according to operator's policies provided by a policy server.

13. The user equipment according to claim 12, wherein the policy server is an access network discovery and selection function server.

14. The user equipment according to claim 10, wherein the network topology aware information server is an application layer traffic optimization server.

15. A network topology aware information server configured to perform a method for optimization of internet protocol traffic between a user equipment having access to an internet protocol network via an internet protocol connectivity access network, and an internet protocol connection endpoint in said internet protocol network, for an application allowing a choice in said internet protocol connection endpoint, said method comprising at least one step based on a selection of an internet protocol connection endpoint according to end-to-end internet protocol traffic optimization criteria, and further comprising:
   upon selection of a new internet protocol connectivity access network traffic path for an already started application, said User Equipment requesting to a network topology aware information server information enabling selection of the internet protocol connection endpoint according to said end-to-end internet protocol traffic optimization criteria;
   wherein internet protocol connectivity access network corresponds to third generation partnership project evolved packet system, and selection of an internet protocol connectivity access network traffic path corresponds to selection of a third generation partnership project or non-third generation partnership project access for an internet protocol flow belonging to an internet protocol connection.

16. The network topology aware information server according to claim 15, wherein the network topology aware information server is an application layer traffic optimization server.

* * * * *